United States Patent
Zhang et al.

(10) Patent No.: US 11,483,868 B2
(45) Date of Patent: Oct. 25, 2022

(54) ACCESS METHOD, NETWORK DEVICE, AND MOBILE COMMUNICATION TERMINAL

(71) Applicants: China Mobile Communication Co., Ltd Research Institute, Beijing (CN); China Mobile Communications Group Co., Ltd., Beijing (CN)

(72) Inventors: Xiaoran Zhang, Beijing (CN); Nan Li, Beijing (CN); Guang Yang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 26 days.

(21) Appl. No.: 16/624,697

(22) PCT Filed: Jun. 14, 2018

(86) PCT No.: PCT/CN2018/091260
§ 371 (c)(1),
(2) Date: Dec. 19, 2019

(87) PCT Pub. No.: WO2018/233543
PCT Pub. Date: Dec. 27, 2018

(65) Prior Publication Data
US 2020/0221500 A1    Jul. 9, 2020

(30) Foreign Application Priority Data
Jun. 19, 2017    (CN) .......................... 201710465288.3

(51) Int. Cl.
*H04W 74/08*    (2009.01)
*H04W 48/16*    (2009.01)

(52) U.S. Cl.
CPC ....... *H04W 74/0833* (2013.01); *H04W 48/16* (2013.01)

(58) Field of Classification Search
CPC .......................... H04W 74/0833; H04W 48/16
See application file for complete search history.

(56) References Cited

U.S. PATENT DOCUMENTS 10,973,019 B2 *   4/2021  Marinier ........... H04W 72/1268
2016/0323049 A1 *  11/2016  Zhang ................ H04W 16/14
(Continued)

FOREIGN PATENT DOCUMENTS

CN    103037441 A    4/2013
EP    2 824 971 A1    1/2015

OTHER PUBLICATIONS

English translation of Preliminary Report on Patentability dated Jan. 2, 2020 and Written Opinion of the International Searching Authority dated Sep. 11, 2018, for PCT/CN2018/091260, 6 pages.

(Continued)

*Primary Examiner* — Michael J Moore, Jr.
(74) *Attorney, Agent, or Firm* — Morgan, Lewis & Bockius LLP

(57) ABSTRACT

An access method, a network device, and a mobile communication terminal are provided. The access method applied to the network device includes transmitting frequency information of a downlink frequency range and at least two uplink frequency ranges and a physical random access channel parameter.

19 Claims, 3 Drawing Sheets

Transmitting a physical random access channel parameter and frequency information of a downlink frequency range and at least two uplink frequency ranges — 101

(56) References Cited

U.S. PATENT DOCUMENTS

| | | | | |
|---|---|---|---|---|
| 2017/0367003 A1* | 12/2017 | Zhang | ............... | H04W 74/0833 |
| 2020/0022145 A1* | 1/2020 | Huang | .............. | H04W 72/0453 |
| 2020/0029369 A1* | 1/2020 | Huang | .............. | H04W 72/0453 |
| 2020/0221500 A1* | 7/2020 | Zhang | ................... | H04W 48/12 |
| 2020/0296749 A1* | 9/2020 | Freda | ................ | H04W 72/1278 |

OTHER PUBLICATIONS

Chinese International Search Report with Written Opinion dated Sep. 11, 2018, for PCT/CN2018/091260, 9 pages.
R1-1709979, 3GPP TSG RAN WG1 NR Ad Hoc Meeting, Qingdao, China, Jun. 27-30, 2017, Agenda Item: 5.1.8, 12 pages.
R1-1710250, 3GPP TSG RAN WG1 Meeting NR Ad-Hoc#2, Qingdao, P.R. China Jun. 27-30, 2017, Agenda Item: 5.1.8, 3 pages.
R1-1710385, 3GPP TSG RAN WG1 NR Ad-Hoc#2, Qingdao, P.R. China, Jun. 27-30, 2017, Agenda Item: 5.1.8, 5 pages.
R1-1704598, 3GPP TSG RAN WG1 Meeting #88bis, Spokane, USA Apr. 3-7, 2017, Agenda item: 8.1.8, 3 pages.
R1-1706905, 3GPP TSG RAN WG1 Meeting #89, Hangzhou, P.R. China May 15-19, 2017, Agenda item: 7.1.8, 13 pages.
R1-1708403, 3GPP TSG RAN WG1 Meeting #89, Hangzhou, P.R. China May 15-19, 2017, Agenda item: 7.1.8, 3 pages.
Chinese Office Action (First) dated Feb. 18, 2021, for Chinese Patent Application No. 201710465288.3, 9 pages.
English Translation of Chinese Office Action (First) dated Feb. 18, 2021, for Chinese Patent Application No. 201710465288.3, 10 pages.

* cited by examiner

Transmitting a physical random access channel parameter and frequency information of a downlink frequency range and at least two uplink frequency ranges — 101

| | Uplink direction | Downlink direction |
|---|---|---|
| Frequency range | U | D |

| | Uplink direction | | Downlink direction |
|---|---|---|---|
| Frequency range | U1 | U2 | D |

ACCESS METHOD, NETWORK DEVICE, AND MOBILE COMMUNICATION TERMINAL

CROSS-REFERENCE TO RELATED APPLICATION

This application is a U.S. national phase application of a PCT Application No. PCT/CN2018/091260 filed on Jun. 14, 2018, which claims a priority to a Chinese Patent Application No. 201710465288.3 filed in China on Jun. 19, 2017, the disclosure of which is incorporated in its entirety by reference herein.

TECHNICAL FIELD

The present disclosure relates to the field of communication technology, and in particular, relates to an access method, a network device and a mobile communication terminal.

BACKGROUND

In a related mobile communication system, uplink and downlink frequency bands in a Time Division Duplexing (TDD) technology have the same frequency range and the same frequency bandwidths; uplink and downlink frequency bands of a Frequency Division Duplexing (FDD) technology have the same frequency bandwidth and different frequency ranges, and uplink and downlink are used in pairs. Therefore, in the related art, frequency ranges of the uplink and downlink frequency bands of a cell are used in pairs, and frequency bandwidths of the uplink and downlink frequency bands are the same. In a Long Term Evolution (LTE)-Advanced technology, carrier aggregation is introduced. Bandwidths of uplink and downlink carriers may be configured differently through uplink carrier aggregation or downlink carrier aggregation. However, in a case that the carrier aggregation is applied to inter-cell aggregation, each cell participating in the carrier aggregation still needs frequency correspondence and the same bandwidth in uplink and in downlink, and does not support a transmission mode in which uplink and downlink frequency ranges do not correspond to each other and bandwidths in uplink and in downlink are different.

In a 5th-generation (5G) mobile communication system, a new spectrum mainly includes high frequencies and a frequency band of millimeter waves. However, the higher a frequency of a frequency band is, the worse an anti-fading performance is, resulting in poorer coverage performance. As can be seen from the above, a coverage performance of the 5G is poor. With application of a large-scale antenna and a beamforming technology, a coverage area of a network device at a downlink frequency band has been enhanced in some degree. However, an effective solution has not been proposed for a problem of a narrow coverage area of a mobile communication terminal at an uplink frequency band since a transmission mode in which the uplink and downlink frequency ranges in a cell do not correspond to each other and bandwidths in uplink and in uplink are different is not supported in the related art. Furthermore, with application of a downlink enhancement technology, difference between coverage areas at the uplink and downlink frequency bands is increasing.

SUMMARY

An objective of the present disclosure is to provide an access method, a network device, and a mobile communication terminal, to enhance a coverage area of the uplink frequency band of the mobile communication terminal, to reduce difference between coverage areas of uplink and downlink frequency bands, and to improve an overall performance of the system.

In a first aspect, the present disclosure provides an access method applied to a network device, and the access method includes: transmitting a physical random access channel parameter and frequency information of a downlink frequency range and at least two uplink frequency ranges.

In a second aspect, the present disclosure further provides an access method applied to a mobile communication terminal, and the access method includes: receiving a physical random access channel parameter and frequency information of a downlink frequency range and at least two uplink frequency ranges transmitted by a network device; and initiating a random access by using a target physical random access channel parameter within a target uplink frequency range of the at least two uplink frequency ranges.

In a third aspect, the present disclosure further provides a network device, and the network device is capable of operating within a downlink frequency range and at least two uplink frequency ranges and includes: a transmitter, configured to transmit a physical random access channel parameter and frequency information of a downlink frequency range and at least two uplink frequency ranges.

In a fourth aspect, the present disclosure further provides a mobile communication terminal, and the mobile communication terminal is capable of operating within a downlink frequency range and at least two uplink frequency ranges and includes: a receiver, configured for receiving a physical random access channel parameter and frequency information of a downlink frequency range and at least two uplink frequency ranges transmitted by a network device; and a processor, configured for initiating a random access by using a target physical random access channel parameter within a target uplink frequency range of the at least two uplink frequency ranges.

In a fifth aspect, the present disclosure further provides a network device including a memory and a processor, wherein the memory stores a computer program executable by the processor, and in a case that the computer program is executed by the processor, the processor implements the access method applied to the network device as described in the first aspect above.

In a sixth aspect, the present disclosure further provides a mobile communication terminal including a memory and a processor, wherein the memory stores a computer program executable by the processor, and in a case that the computer program is executed by the processor, the processor implements the access method applied to the mobile communication terminal as described above.

In a seventh aspect, the present disclosure further provides a non-transitory computer readable storage medium including a computer program stored thereon, wherein in a case that the computer program is executed by a processor, the processor implements the access method applied to the network device as described in the first aspect above, or implements the access method applied to the mobile communication terminal as described in the second aspect above.

In the present disclosure, both the network device and the mobile communication terminal are capable of operating within a downlink frequency range and at least two uplink frequency ranges. The network device transmits a physical random access channel parameter and frequency information of a downlink frequency range and at least two uplink frequency ranges to the mobile communication terminal, so that after the mobile communication terminal receives the physical random access channel parameter and the frequency information of the downlink frequency range and the at least two uplink frequency ranges transmitted by the network device, the mobile communication terminal initiates a random access by using a target physical random access channel parameter within a target uplink frequency range of the at least two uplink frequency ranges. Since at least one uplink frequency range in a low frequency band is added based on an existing frequency band, the uplink frequency range in the low frequency band is paired with an uplink frequency range in a high frequency band, and an uplink coverage area at the high frequency band can be compensated by using an uplink coverage area at the low frequency band, thereby enhancing the uplink coverage area of the mobile communication terminal, reducing the difference between the coverage areas at the uplink and downlink frequency bands, and improving an overall performance of the system.

BRIEF DESCRIPTION OF THE DRAWINGS

In order to more clearly illustrate technical solutions of the present disclosure, drawings used in description of the present disclosure will be briefly described below. It is obvious that the drawings in the following description are only some embodiments of the present disclosure, and other drawings can be obtained by those skilled in the art according to these drawings without paying creative efforts.

DETAILED DESCRIPTION

The technical solutions of the present disclosure will be clearly and completely described below in combination with the drawings of the present disclosure. It is apparent that embodiments described herein are only some embodiments of the present disclosure, but are not all of embodiments thereof. Based on the embodiments of the present disclosure, all the other embodiments obtained by those of ordinary skills in the art without paying any creative work are within the protection scope of the present disclosure.

The present disclosure provides an access method. A network device transmits a physical random access channel parameter and frequency information of a downlink frequency range and at least two uplink frequency ranges. A mobile communication terminal receives the physical random access channel parameter and the frequency information of the downlink frequency range and the at least two uplink frequency ranges transmitted by the network device; and initiates a random access by using a target physical random access channel parameter within a target uplink frequency range of the at least two uplink frequency ranges. Since at least one uplink frequency range in a low frequency band is added based on an existing frequency band, the uplink frequency range in the low frequency band is paired with an uplink frequency range in a high frequency band, and an uplink coverage area at the high frequency band can be compensated by using an uplink coverage area at the low frequency band, thereby enhancing the uplink coverage area of the mobile communication terminal, reducing the difference between the coverage areas at the uplink and downlink frequency bands, and improving an overall performance of the system.

Here, it should be noted that the at least two uplink frequency ranges in specific embodiments of the present disclosure are different from multiple subcarriers in the related art, and the at least two uplink frequency ranges in the specific embodiments of the present disclosure correspond to an asymmetric uplink-downlink transmission technology, and an uplink carrier or an uplink frequency band in the related art is paired with a downlink frequency band.

Figures 1, 2, 3, 4:
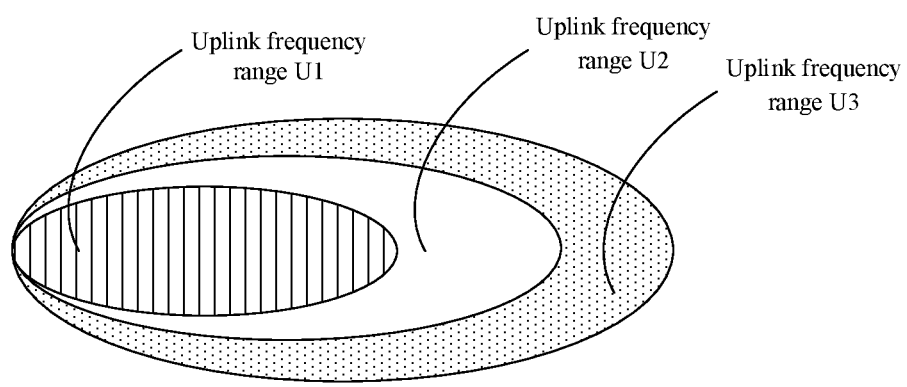
FIG. 1 is a flow chart of an access method provided by the present disclosure.
FIG. 2 is a schematic diagram of a frequency range corresponding to a transmission direction provided by the related art.
FIG. 3 is a schematic diagram of a frequency range corresponding to a transmission direction provided by the present disclosure.
FIG. 4 is a schematic diagram of an uplink frequency range provided by the present disclosure.

Referring to FIG. 1, FIG. 1 is a flow chart of an access method provided by the present disclosure. The access method in this embodiment is applied to a network device, and the network device may support in a downlink frequency range and at least two uplink frequency ranges. As shown in FIG. 1, a following step 101 is included.

Step 101: transmitting a physical random access channel parameter and frequency information of a downlink frequency range and at least two uplink frequency ranges.

In the present disclosure, illustration is given by using an example that the network device may transmit, to a mobile communication terminal, information and/or parameters through a broadcast message of a cell, but a manner in which the network device transmits information and/or parameters to the mobile communication terminal is not limited thereto in the present disclosure. In addition, any one of the at least two uplink frequency ranges in the step corresponds to a frequency band, respectively.

That is, the access method of the present disclosure is applied to the network device capable of operating within a downlink frequency range and at least two uplink frequency ranges. The access method includes: transmitting frequency indication information and a physical random access channel parameter, wherein the frequency indication information includes frequency information of a downlink frequency range and at least two uplink frequency ranges.

The physical random access channel parameter is used by the terminal to select an access uplink frequency range from the at least two uplink frequency ranges, and the physical random access channel parameter includes a center frequency point of the uplink frequency range used by terminal for access.

The network device of the present disclosure may be a base station.

In a Long Term Evolution (LTE) system, each of an uplink transmission direction and a downlink transmission direction of any cell to which the network device belongs support only one frequency range, and a frequency range supported by the uplink transmission direction is paired with a frequency range supported by the downlink transmission direction. For convenience of understanding, referring to FIG. 2, as shown in FIG. 2, an uplink transmission direction only supports a frequency range U, a downlink transmission direction only supports a frequency range D, and the frequency range U is paired with the frequency range D, wherein a center frequency of the frequency range U may be 3.5 GHz, and a center frequency of the frequency range D may be 3.5 GHz, but is not limited thereto. Therefore, the cell only broadcasts a frequency-frequency-band number supported by the cell, and the frequency-band number carries only an uplink frequency range and a downlink frequency range.

However, in the present disclosure, the network device is capable of operating within a downlink frequency range and at least two uplink frequency ranges. A frequency of a frequency band is inversely proportional to a coverage performance of the frequency band, that is, the higher the frequency of the frequency band is, the poorer the coverage performance of the frequency band is. Thus, it can be understood that the frequency band of at least one uplink frequency range of the at least two uplink frequency ranges is lower than a frequency band of an uplink frequency range in the 5G system, so that the uplink coverage area at the high frequency band may be compensated by using the uplink coverage area at the low frequency band, thereby enhancing the coverage area at the uplink frequency band of the mobile communication terminal, reducing the difference between the coverage areas of the uplink and downlink frequency bands, and improving the overall performance of the system. For convenience of understanding, referring to FIG. 3, as shown in FIG. 3, the uplink transmission direction supports two frequency ranges, namely a frequency range U1 and a frequency range U2, and the downlink transmission direction only supports the frequency range D, thereby achieving asymmetric transmission in uplink and in downlink, wherein the center frequency of the frequency range U1 may be 3.5 GHz, the center frequency of the frequency range U2 may be 900 MHz, and the center frequency of the frequency range D may be 3.5 GHz, but the present disclosure is not limited thereto. It should be noted that the number of the uplink frequency ranges in FIG. 3 is only an illustration, and thus does not limit the number of the uplink frequency ranges supported in the uplink direction, and a scheme of a specific embodiment of the present disclosure may be applied to two or more uplink frequency ranges. Therefore, a broadcast message of the cell in the embodiment carries the frequency information of the at least two uplink frequency band ranges and a downlink frequency band range.

Specifically, the cell may broadcast a new frequency-band number in a Frequency Band Indicator (FBI), the new frequency-band number carries the at least two uplink frequency band ranges and the downlink frequency band range, for example, the center frequency of the downlink frequency range is 3.5 GHz, and the center frequencies of the uplink frequency range are 3.5 GHz and 900 MHz, respectively.

The cell can also broadcast a traditional frequency-band number in the FBI, and broadcast a Supplement Uplink (referred to as SUL) frequency range supported by the cell, wherein the traditional frequency-band number carries an uplink frequency range and a downlink frequency range. For example, the traditional frequency-band number carries an uplink frequency range having a center frequency of 3.5 GHz and a downlink frequency range having a center frequency of 3.5 GHz, and a SUL frequency range having a center frequency of 900 MHz supported by the cell is broadcasted in a Multi Band Info List.

The cell can also broadcast a traditional frequency-band number in the FBI, and broadcast a Supplement Uplink (referred to as SUL) frequency range supported by the cell, wherein the traditional frequency-band number carries only a downlink frequency range. For example, the traditional frequency-band number carries a downlink frequency range having a center frequency of 3.5 GHz, and SUL frequency ranges having center frequencies of 900 MHz and 3.5 GHz are broadcasted in a Multi Band Info List.

Certainly, the cell may also encapsulate the frequency information of the at least two uplink frequency band ranges and the downlink frequency band range in the broadcast information in other ways, such as by using a reserved field in the broadcast information, which is not limited herein.

In this embodiment, the broadcast message of the cell further includes a physical random access channel parameter, so that the mobile communication terminal initiates a random access to the network device by using the physical random access channel parameter. The physical random access channel parameter may be groups of random access resources, but is not limited thereto. For the groups of random access resources, different groups of the groups of random access resources corresponds to different uplink frequency ranges, for example, different random access resources are respectively allocated to the uplink frequency ranges having center frequencies of 900 MHz and 3.5 GHz.

In the present disclosure, the network device can establish communication with the mobile communication terminal, and both the network device and the mobile communication terminal are capable of operating within a downlink frequency range and at least two uplink frequency ranges. The network device may be an eLTE network device or also may be a 5G network device, but is not limited thereto. The mobile communication terminal can be a terminal side equipment such as a mobile phone, a Tablet Personal Computer, a Laptop Computer, a Personal Digital Assistant (PDA), a Mobile Internet Device (MID), or a Wearable Device, but is not limited thereto.

In the access method provided by the disclosure, the network device transmits frequency information of a downlink frequency range and at least two uplink frequency ranges and a physical random access channel parameter, so that the mobile communication terminal receives the frequency information of the downlink frequency range and the at least two uplink frequency ranges and the physical random access channel parameter, and initiates a random access by using a target physical random access channel parameter within a target uplink frequency range of the at least two uplink frequency ranges. Since at least one uplink frequency range within a low frequency band is added based on an existing frequency band, the uplink frequency range in the low frequency band is paired with the uplink frequency range in the high frequency band, and the uplink coverage area at the high frequency band can be compensated by using the uplink coverage area at the low frequency band, thereby enhancing the coverage area at the uplink frequency band of the mobile communication terminal, thereby reducing the difference between the coverage areas at the uplink and downlink frequency bands, and improving the overall performance of the system.

Optionally, the access method further includes: transmitting at least one of a selection parameter, a first priority-level parameter, a second priority-level parameter, and an access probability parameter; wherein the selection parameter is used by the mobile communication terminal to determine an access uplink frequency range from the at least two uplink frequency ranges, or to select an access physical random access channel parameter from the received physical random access channel parameter; the first priority-level parameter is used to indicate priority levels corresponding to the at least two uplink frequency ranges; the second priority-level parameter is used to indicate a priority level corresponding to the physical random access channel parameter; and the access probability parameter is used to indicate access probability values corresponding to the at least two uplink frequency ranges.

In the present disclosure, the same cell corresponds to at least two uplink frequency ranges, and how the terminal determines the target uplink frequency range and the target physical random access channel parameter may be implemented in various manners.

In one manner, the network side may further transmit other parameters to control the terminal to determine the target uplink frequency range and the target physical random access channel parameter, which is further described below.

In a specific embodiment of the present disclosure, the method may also include: transmitting at least one of a selection parameter, a first priority-level parameter, a second priority-level parameter, and an access probability parameter; wherein the selection parameter is used by the mobile communication terminal to determine an access uplink frequency range from the at least two uplink frequency ranges, or to select an access physical random access channel parameter from the received physical random access channel parameter; the first priority-level parameter is used to indicate priority levels corresponding to the at least two uplink frequency ranges; the second priority-level parameter is used to indicate priority levels corresponding to the physical random access channel parameter; and the access probability parameter is used to indicate access probability values corresponding to the at least two uplink frequency ranges.

When the broadcast message is transmitted, that is, the broadcast message of the cell further carries at least one of a selection parameter, a first priority-level parameter, a second priority-level parameter, and an access probability parameter, so that the mobile communication terminal receives the foregoing parameters transmitted by the network device, selects an uplink frequency range from the at least two uplink frequency ranges based on the at least one of the foregoing parameters, and initiates a random access to the network device within the uplink frequency range, thereby increasing a successful probability of the random access of the mobile communication terminal.

In the step, the selection parameter may be a frequency range selection parameter, and is used by the mobile communication terminal to select the access uplink frequency range from the at least two uplink frequency ranges, i.e., the mobile communication terminal can initiate a random access within the access uplink frequency range; the selection parameter can also be a physical random access channel selection parameter, and is used by the mobile communication terminal to select the access physical random access channel parameter from the received physical random access channel parameter, so that the mobile communication terminal initiates a random access within the uplink frequency range corresponding to the access physical random access channel parameter, thereby increasing the successful probability of the random access of the mobile communication terminal.

Optionally, the selection parameter is a minimum downlink signal threshold. Specifically, the selection parameter is a minimum downlink signal threshold that allows the mobile communication terminal to access through a certain uplink frequency range, so that the mobile communication terminal determines, based on a measured downlink signal quality and a minimum downlink signal threshold of each received uplink frequency range, the coverage area of the uplink frequency range in which the mobile communication terminal is located. Specifically, if the downlink signal quality measured by the mobile communication terminal is greater than the minimum downlink signal threshold of a certain uplink frequency range, it means that the mobile communication terminal is within the coverage area of the uplink frequency range, and the mobile communication terminal may perform a random access in the uplink frequency range. The minimum downlink signal threshold may be one or more of a Reference Signal Receiving Power (RSRP), a Reference Signal Receiving Quality (RSRQ), and a Signal to Interference plus Noise Ratio (SINR) of a cell. In this way, the mobile communication terminal can initiate the random access to the network device within a target uplink frequency range in the uplink frequency ranges in which the mobile communication terminal may perform an access procedure, thereby increasing the successful probability of the random access of the mobile communication terminal.

Further, in the at least two uplink frequency ranges, except for a frequency range having the largest coverage area, each frequency range has a respective minimum downlink signal threshold for allowing access, and a frequency range having a smaller coverage area corresponds to a higher minimum downlink signal threshold. For convenience of understanding, referring to FIG. 4, as shown in FIG. 4, an uplink transmission direction supports three uplink frequency ranges, namely an uplink frequency range U1, an uplink frequency range U2, and an uplink frequency range U3, wherein, the uplink frequency range U1 has the minimum coverage area, the uplink frequency range U2 has a larger coverage area, and the uplink frequency range U3 has the largest coverage area. The minimum downlink signal threshold T1 is the minimum downlink signal threshold that allows the mobile communication terminal to access through the uplink frequency range U1, and the minimum downlink signal threshold T2 is the minimum downlink signal threshold that allows the mobile communication terminal to access through the uplink frequency range U2. As can be seen from the above, the minimum downlink signal threshold T1 is greater than the minimum downlink signal threshold T2.

If the measured downlink signal value is greater than the minimum downlink signal threshold T1, that is, the difference between the measured downlink signal value and the minimum downlink signal threshold T1 is greater than 0, the measured downlink signal value is greater than the minimum downlink signal threshold T2 based on the minimum downlink signal threshold T1 being greater than the minimum downlink signal threshold T2, that is, the difference between the measured downlink signal value and the minimum downlink signal threshold T2 is greater than 0. This indicates that the mobile communication terminal can access the uplink frequency range U1, the uplink frequency range U2, and the uplink frequency range U3, and the mobile communication terminal are within the coverage areas of the uplink frequency range U1, the uplink frequency range U2, and the uplink frequency range U3.

If the measured downlink signal value is less than the minimum downlink signal threshold T1, but is greater than the minimum downlink signal threshold T2, this indicates that the mobile communication terminal can access the uplink frequency range U2 and the uplink frequency range U3, and the mobile communication terminal is within the coverage areas of the uplink frequency range U2 and the uplink frequency range U3.

If the measured downlink signal value is less than the minimum downlink signal threshold T2, it indicates that the mobile communication terminal can access the uplink frequency range U3, and the mobile communication terminal is within the coverage area of the uplink frequency range U3.

In the step, the first priority-level parameter is used to indicate priority levels corresponding to the at least two uplink frequency ranges. Further, in one manner, the higher the center frequency of the uplink frequency range is, the higher the priority level of the uplink frequency range is. For example, the uplink frequency range having a center frequency of 3.5 GHz has a higher priority level, and the uplink frequency range having a center frequency of 900 MHz has a lower priority level. In this way, after the mobile terminal receives the frequency information of the at least two uplink frequency ranges, the uplink frequency range having the higher priority level may be preferentially selected from the at least two uplink frequency ranges according to the priority level of each uplink frequency range, and a random access is initiated to the network device within the uplink frequency range, thereby increasing the successful probability of the random access of the mobile communication terminal.

In the step, the second priority-level parameter is used to indicate the priority level corresponding to the physical random access channel parameter. Further, in one manner, the higher the center frequency of an uplink frequency range is, the higher the priority level of the physical random access channel parameter corresponding to the uplink frequency range is. For example, the physical random access channel parameter having a center frequency of 3.5 GHz has a higher priority level, and the physical random access channel parameter having the center frequency of 900 MHz has a lower priority level. After the mobile terminal receives the frequency information of the at least two uplink frequency ranges, the mobile terminal may preferentially select, from the at least two uplink frequency ranges, the uplink frequency range corresponding to the access physical random access channel parameter having the higher priority level according to the priority level of the physical random access channel parameter corresponding to each uplink frequency range, and initiates a random access to the network device within the uplink frequency range, thereby increasing the successful probability of the random access of the mobile communication terminal.

In the step, the access probability parameter is used to indicate access probability values, corresponding to the at least two uplink frequency ranges, of allowability of the mobile communication terminal to access the network device, so that the mobile communication terminal compares access probability values corresponding to uplink frequency ranges based on a detected access random number, determines an access uplink frequency range in which the mobile communication terminal initiates a random access to the network device, and selects a target uplink frequency range from the access uplink frequency ranges and initiates a random access to the network device, thereby increasing the successful probability of the random access of the mobile communication terminal, wherein the access random number of an uplink frequency range is between 0 and 1.

Specifically, if the detected access random number is less than an access probability value corresponding to a certain uplink frequency range, the mobile communication terminal may initiate a random access within the uplink frequency range; if the detected access random number is larger than or equal to the access probability value corresponding to the certain uplink frequency range, continue to use the same way to determine whether the random access can be initiated within other uplink frequency ranges. Further, the access probability parameter may be an access probability value P corresponding to each uplink frequency range of the at least two uplink frequency ranges. An access probability value P may correspond to different service types in the each uplink frequency range, and a mapping relationship between different service types in an uplink frequency ranges and an access probability value P is shown in Table 1.

TABLE 1 a mapping relationship between different service types in an uplink frequency range and an access probability value P

|  | Service type one | Service type two | Service type three |
| --- | --- | --- | --- |
| Uplink frequency range U1 | P1-1 | P1-2 | P1-3 |
| Uplink frequency range U2 | P2-1 | P2-2 | P2-3 |

Optionally, the method further includes: transmitting a frequency range designation parameter, wherein the frequency range designation parameter is used to designate at least one uplink frequency range of the at least two uplink frequency ranges.

In the present disclosure, the same cell corresponds to at least two uplink frequency ranges. Therefore, in this step, the broadcast message of the cell further carries a frequency range designation parameter, so that the mobile communication terminal receives the frequency range designation parameter transmitted by the network device, selects, based on the frequency range designation parameter, a target uplink frequency range as an access uplink frequency range from at least one uplink frequency range designated in the at least two uplink frequency ranges, and initiates a random access to the network device within the target uplink frequency range, thereby increasing the successful probability of the random access of the mobile communication terminal. For example, a broadcast of the cell allows the mobile communication terminal to initiate a random access within the uplink frequency range having a center frequency of 900 MHz, that is, the center frequency of the uplink frequency range designated by the frequency range designation parameter is 900 MHz, the mobile communication terminal may only initiate a random access within the uplink frequency range having the center frequency of 900 MHz, but cannot initiate the random access within other uplink frequency ranges, such as within the uplink frequency range having a center frequency of 3.5 GHz. Since the uplink frequency range having the center frequency of 900 MHz is the uplink frequency range designated by the network device, in a case that the random access is initiated within the uplink frequency range, the target uplink frequency range is one of the uplink frequency ranges designated by the network device, the random access is successful after the network device receives a random access response, thereby increasing the successful probability of the random access.

Figure 5:
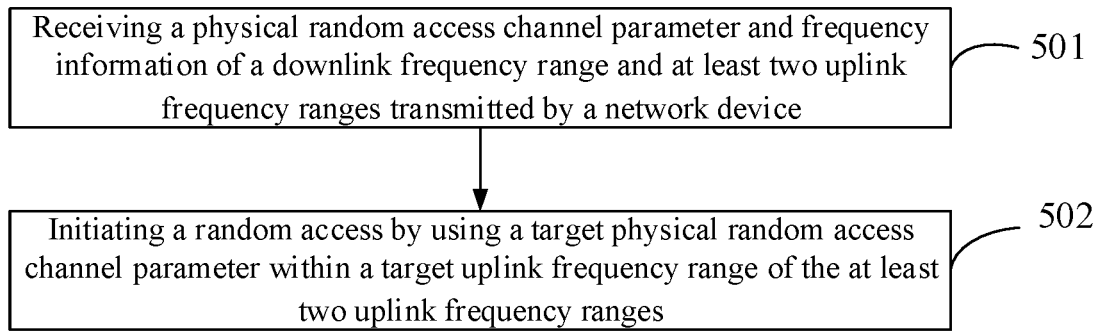
FIG. 5 is another flow chart of an access method provided by the present disclosure.

The present disclosure also provides an access method, and the access method is applied to a mobile communication terminal. FIG. 5 is another flow chart of an access method provided by the present disclosure, as shown in FIG. 5, and the access method includes following steps 501-502.

Step 501: receiving a physical random access channel parameter and frequency information of a downlink frequency range and at least two uplink frequency ranges transmitted by a network device.

It should be noted that, this embodiment is used as an implementation of the mobile communication terminal corresponding to the foregoing embodiments, description of the "physical random access channel parameter and frequency information of at least two uplink frequency ranges transmitted by a network device" in this embodiment may be obtained by referring to related description in the foregoing embodiments, which is omitted here to avoid repetition.

Step 502: initiating a random access by using a target physical random access channel parameter within a target uplink frequency range of the at least two uplink frequency ranges.

In this step, the mobile communication terminal can randomly select, as a target uplink frequency range, an uplink frequency range from the at least two uplink frequency ranges, and initiate the random access by using the target physical random access channel parameter corresponding to the target uplink frequency range; certainly, the mobile communication terminal may also select, as the target uplink frequency range, an uplink frequency range from the at least two uplink frequency ranges based on a preset rule, and initiate the random access by using the target physical random access channel parameter corresponding to the target uplink frequency range, which is not limited here.

The access method of the present embodiment receives the physical random access channel parameter and frequency information of a downlink frequency range and at least two uplink frequency ranges transmitted by the network device; initiates the random access by using the target physical random access channel parameter within a target uplink frequency range of the at least two uplink frequency ranges. Since at least one uplink frequency range in a low frequency band is added based on an existing frequency band, the uplink frequency range in the low frequency band is paired with an uplink frequency range in a high frequency band, and an uplink coverage area at the high frequency band can be compensated by using an uplink coverage area at the low frequency band, thereby enhancing the uplink coverage area of the mobile communication terminal, reducing the difference between the coverage areas at the uplink and downlink frequency bands, and improving an overall performance of the system.

Optionally, the method further includes: receiving at least one of a selection parameter, a first priority-level parameter, a second priority-level parameter, and an access probability parameter transmitted by the network device; wherein the selection parameter is used by the mobile communication terminal to select an access uplink frequency range from the at least two uplink frequency ranges, or to select an access physical random access channel parameter from the received physical random access channel parameter; the first priority-level parameter is used to indicate priority levels corresponding to the at least two uplink frequency ranges; the second priority-level parameter is used to indicate a priority level corresponding to the physical random access channel parameter; and the access probability parameter is used to indicate access probability values corresponding to the at least two uplink frequency ranges.

It should be noted that, this embodiment is used as implementation of the mobile communication terminal corresponding to the foregoing embodiments, description of the "at least one of a selection parameter, a first priority-level parameter, a second priority-level parameter, and an access probability parameter transmitted by the network device" and various parameters in this embodiment may be obtained by referring to related description of the foregoing embodiments, which is omitted here to avoid repetition.

Optionally, initiating the random access by using a target physical random access channel parameter within a target uplink frequency range of the at least two uplink frequency ranges specifically includes: determining the access uplink frequency range from the at least two uplink frequency ranges according to the received selection parameter; determining the target uplink frequency range from the access uplink frequency range, and determining the target physical random access channel parameter; and initiating the random access by using the target random access channel parameter within the target uplink frequency range.

In the step, the mobile communication terminal compares the received selection parameter with a signal value measured by itself, and determines the access uplink frequency range from the at least two uplink frequency ranges, wherein the selection parameter may be a minimum downlink signal threshold, correspondingly, the signal value may be a downlink signal value. For ease of understanding, this step is illustrated in combination with FIG. 4, as shown in FIG. 4, the uplink transmission direction supports three uplink frequency ranges, namely an uplink frequency range U1, an uplink frequency range U2, and an uplink frequency range U3, wherein, the uplink frequency range U1 has the minimum coverage area, the uplink frequency range U2 has a larger coverage area, and the uplink frequency range U3 has the largest coverage area. The minimum downlink signal threshold T1 is the minimum downlink signal threshold that allows the mobile communication terminal to access through the uplink frequency range U1, and the minimum downlink signal threshold T2 is the minimum downlink signal threshold that allows the mobile communication terminal to access through the uplink frequency range U2. The minimum downlink signal threshold T1 is greater than the minimum downlink signal threshold T2. If the measured downlink signal value is smaller than the minimum downlink signal threshold T1, but greater than the minimum downlink signal threshold T2, then it indicates that the mobile communication terminal is in coverage areas of the uplink frequency range U2 and the uplink frequency range U3, i.e., the access uplink frequency range includes the uplink frequency range U2 and the uplink frequency range U3.

In the step, after the mobile communication terminal selects the access uplink frequency range, or selects the access physical random access channel parameter from the received physical random access channel parameter, the mobile communication terminal may randomly select, as the target uplink frequency range, an uplink frequency range from the access uplink frequency range, and initiates the random access by using the target physical random access channel parameter corresponding to the target uplink frequency range; certainly, the mobile communication terminal may also select, as the target uplink frequency range, an uplink frequency range from the access uplink frequency ranges based on a preset rule, and initiate the random access by using the target physical random access channel parameter corresponding to the target uplink frequency range, which is not limited here. For example, the mobile communication terminal initiates the access at a fixed uplink frequency according to an uplink coverage area in which the mobile communication terminal is located, as shown in FIG. 4, a mobile communication terminal in the coverage areas of the uplink frequency range U1, the uplink frequency range U2, and the uplink frequency range U3 initiates a random access within the uplink frequency range U1; a mobile communication terminal in the coverage areas of the uplink frequency range U2 and the uplink frequency range U3 initiates the random access within the uplink frequency range U2; a mobile communication terminal only in the uplink frequency range U3 initiates the random access within the uplink frequency range U3.

Optionally, determining the target uplink frequency range from the access uplink frequency ranges specifically includes: randomly selecting an uplink frequency range from the access uplink frequency ranges as the target uplink frequency range.

In this step, in a case that the access uplink frequency ranges are the uplink frequency range U2 and the uplink frequency range U3, the mobile communication terminal may select the uplink frequency range U2 as the target uplink frequency range, or may select the uplink frequency range U3 as the target uplink frequency range, which is not limited herein.

Optionally, determining the target uplink frequency range from the access uplink frequency ranges, and determining the target physical random access channel parameter specifically includes: determining the target uplink frequency range and/or the target physical random access channel parameter according to at least one of the first priority-level parameter, the second priority-level parameter, and the access probability parameter being received.

In the step, after the access uplink frequency range is selected, or the physical random access channel parameter is selected from the received physical random access channel parameter, the mobile communication terminal can further determine the target uplink frequency range and/or the target physical random access channel parameter according to at least one of the first priority-level parameter, second priority-level parameter, and the access probability parameter being received.

Specifically, after the access uplink frequency range is selected, or the access physical random access channel parameter is selected from the physical random access channel parameter being received, the mobile communication terminal may further determine the target uplink frequency range according to the received first priority-level parameter, and determine the physical random access channel parameter corresponding to the target uplink frequency range as the target physical random access channel parameter. For example, if the uplink frequency range is selected, or the access physical random access channel parameters selected from the received physical random access channel parameters are access physical random access channel parameter corresponding to the uplink frequency range U2 and the uplink frequency range U3, the target uplink frequency range is determined according to indication of priority levels corresponding to the uplink frequency range U2 and the uplink frequency range U3. As can be seen from the above embodiment, the higher the center frequency of the uplink frequency range IS, the higher the priority level of the uplink frequency range is. Therefore, if the center frequency of the uplink frequency range U2 is greater than the center frequency of the uplink frequency range U3, it indicates that the priority level of the uplink frequency range U2 is higher, accordingly, the uplink frequency range U2 can be selected as the target uplink frequency range.

Specifically, after the access uplink frequency range is selected, or after the access physical random access channel parameter is selected from physical random access channel parameter being received, the mobile communication terminal may further determine the target physical random access channel parameter according to the second priority-level parameter being received, and determine the uplink frequency range corresponding to the target physical random access channel parameter as the target uplink frequency range. For example, if the uplink frequency range is selected, or the access physical random access channel parameter selected from the received physical random access channel parameter includes the physical random access channel parameters corresponding to the uplink frequency range U2 and the uplink frequency range U3, the target uplink frequency range may be determined according to indication of priority levels corresponding to the physical random access channel parameter of the uplink frequency range U2 and the physical random access channel parameter of the uplink frequency range U3. As can be seen from the above embodiment, the higher the center frequency of the uplink frequency range is, the higher the priority level of the physical random access channel parameter of the uplink frequency range is. Therefore, if the center frequency of the uplink frequency range U2 is less than the center frequency of the uplink frequency range U3, it indicates that the physical random access channel parameter of the uplink frequency range U3 has a higher priority, so that the physical random access channel parameter of the uplink frequency range U3 can be selected as the target physical random access channel parameter.

Specifically, after the access uplink frequency range is selected, or the access physical random access channel parameter is selected from the received physical random access channel parameter, the mobile communication terminal may further determine the target uplink frequency range according to the received access probability parameter, and further determines the physical random access channel parameter corresponding to the target uplink frequency range as the target physical random access channel parameter. For example, if the uplink frequency range is selected, or the access physical random access channel parameter selected from the received physical random access channel parameter includes physical random access channel parameters corresponding to the uplink frequency range U2 and the uplink frequency range U3, the target uplink frequency range is determined according to indication of probabilities, corresponding to the at least two uplink frequency ranges, of allowing the mobile communication terminal to access the network device. As may be seen from the above embodiment, if the detected access random number is less than the access probability corresponding to a certain uplink frequency range, the mobile communication terminal may initiate the random access within the uplink frequency range; otherwise, continue to use the same way to determine whether the random access can be initiated within other uplink frequency ranges. Therefore, in a case that an access probability at the uplink frequency range U2 is 0.5 and an access random number detected by the mobile terminal is 0.4, it indicates that the mobile communication terminal can initiate a random access within the uplink frequency range U2.

Further, if there are multiple uplink frequency ranges that meet an access probability requirement, the mobile communication terminal may randomly select an uplink frequency range to initiate the random access, or combine the first priority-level parameter and the second priority-level parameter to select an uplink frequency range to initiate the random access, which is not limited here.

It can be understood that, after the access uplink frequency range is selected, or the access physical random access channel parameter is selected from the received physical random access channel parameter, the mobile communication terminal may further determine, according to a combination of any two of the first priority-level parameter, the second priority-level parameter and the access probability parameter, or a combination of all of the three parameters, the target uplink frequency range from the access uplink frequency range, and determine the target physical random access channel parameter.

Optionally, the selection parameter is a minimum downlink signal threshold; in the at least two uplink frequency ranges, except for a frequency range having the largest coverage area, each frequency range has the respective minimum downlink signal threshold for allowing access, a frequency range having a smaller coverage area corresponds to a higher minimum downlink signal threshold; and the minimum downlink signal threshold corresponding to the access uplink frequency range or a sum of the corresponding minimum downlink signal threshold and a compensation value is less than a downlink signal measurement value.

It should be noted that, this embodiment is used as implementation of the mobile communication terminal corresponding to the foregoing embodiment, description of the "the selection parameter" in this embodiment may be obtained by referring to related description of the foregoing embodiments, which is omitted here to avoid repetition.

In the step, considering different types of mobile communication terminals, such as different power levels, mobile communication terminals having different transmission power levels detect different uplink coverage areas. Therefore, in a case that the terminal determines the access uplink frequency range, a compensation value is introduced to represent an uplink gain corresponding to an access uplink frequency range type. Specifically, if a downlink signal quality measured by the mobile communication terminal is greater than a sum of the minimum downlink signal threshold of a certain uplink frequency range and the compensation value of the mobile communication terminal, it indicates that the mobile communication terminal can access the uplink frequency range, the mobile communication terminal is in coverage area of the uplink frequency range, i.e., the uplink frequency range is the access uplink frequency range. The compensation value may be the maximum transmission power, allowed by the network device, of the mobile communication terminal, but is not limited thereto.

Optionally, the method further includes: receiving a frequency range designation parameter transmitted by the network device, wherein the frequency range designation parameter is used to designate at least one uplink frequency range of the at least two uplink frequency ranges and the target uplink frequency range is one of the at least one uplink frequency range.

It should be noted that, this embodiment is used as the implementation of the mobile communication terminal corresponding to the foregoing embodiment, the description of the "frequency range designation parameter" in this embodiment may be obtained by referring to the related description of the foregoing embodiment, which is omitted here to avoid repetition.

In the step, the mobile communication terminal selects the access uplink frequency range based on the frequency range designation parameter, or selects the access physical random access channel parameter from the received physical random access channel parameter; if the number of access uplink frequency ranges is greater than 1, an uplink frequency range may be randomly selected as the target uplink frequency range from the access uplink frequency ranges, or an uplink frequency range may be further randomly selected as the target uplink frequency range from the access uplink frequency ranges according to at least one of the selection parameter, the first priority-level parameter, the second priority-level parameter, and the access probability parameter. Optionally, the at least one frequency range is an uplink frequency range having the largest coverage area in the at least two uplink frequency ranges. The present disclosure is not limited thereto. In a case that the mobile communication terminal initiates a random access within the target uplink frequency range, since the target uplink frequency range is one of the uplink frequency ranges designated by the network device, the random access is successful after the network device receives a random access response, thereby increasing the successful probability of the random access.

Figure 6:
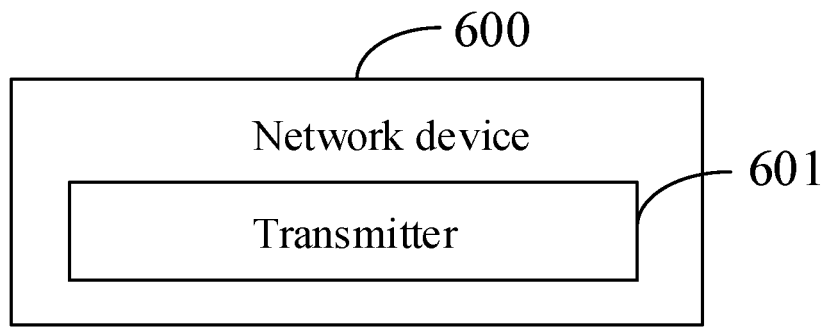
FIG. 6 is a schematic diagram of a network device provided by the present disclosure.

The present disclosure further provides a network device, and the network device is capable of operating within a downlink frequency range and at least two uplink frequency ranges. FIG. 6 is a schematic diagram of a network device provided by the present disclosure. As shown in FIG. 6, the network device 600 includes a transmitter 601 configured to transmit a physical random access channel parameter and frequency information of at least two uplink frequency ranges.

Optionally, the transmitter 601 is further configured to transmit at least one of a selection parameter, a first priority-level parameter, a second priority-level parameter, and an access probability parameter; wherein the selection parameter is used by the mobile communication terminal to determine an access uplink frequency range from the at least two uplink frequency ranges; the first priority-level parameter is used to indicate priority levels corresponding to the at least two uplink frequency ranges; the second priority-level parameter is used to indicate a priority level corresponding to the physical random access channel parameter; and the access probability parameter is used to indicate access probability values corresponding to the at least two uplink frequency ranges.

Optionally, the selection parameter is a minimum downlink signal threshold.

Optionally, in the at least two uplink frequency ranges, except for a frequency range having the largest coverage area, each frequency range has the respective minimum downlink signal threshold for allowing access, and a frequency range having a smaller coverage area corresponds to a higher minimum downlink signal threshold.

Optionally, the transmitter 601 is further configured to transmit a frequency range designation parameter; and the frequency range designation parameter is used to designate at least one uplink frequency range of the at least two uplink frequency ranges.

Optionally, the at least one frequency range is an uplink frequency range having the largest coverage area in the at least two uplink frequency ranges.

The network device of the present disclosure transmits, by using the transmitter, a physical random access channel parameter and frequency information of a downlink frequency range and at least two uplink frequency ranges, so that the mobile communication terminal receives the frequency information of the downlink frequency range and the at least two uplink frequency ranges and the physical random access channel parameter, and initiates the random access by using the target physical random access channel parameter within a target uplink frequency range of the at least two uplink frequency ranges, wherein both the network device and the mobile communication terminal are capable of operating within a downlink frequency range and at least two uplink frequency ranges. Since at least one uplink frequency range in a low frequency band is added based on an existing frequency band, the uplink frequency range in the low frequency band is paired with an uplink frequency range in a high frequency band, and an uplink coverage area at the high frequency band can be compensated by using an uplink coverage area at the low frequency band, thereby enhancing the uplink coverage area of the mobile communication terminal, reducing the difference between the coverage areas at the uplink and downlink frequency bands, and improving an overall performance of the system.

Figure 7:
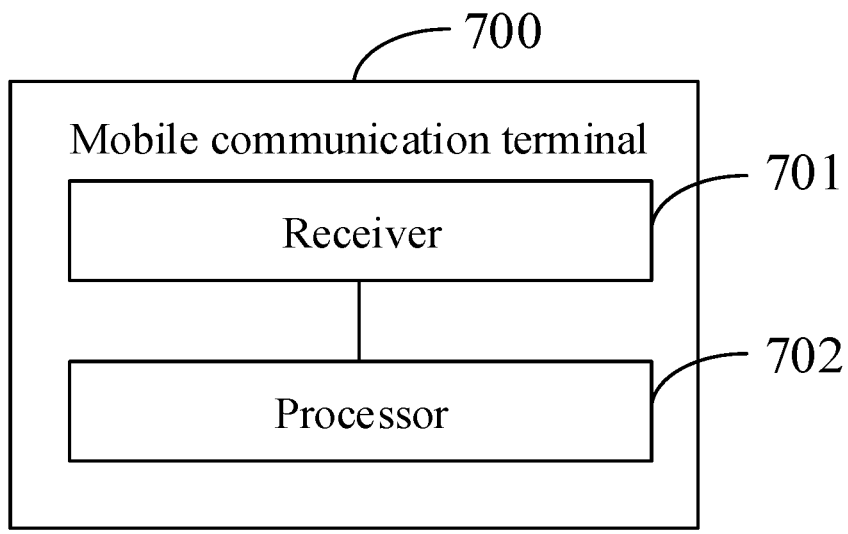
FIG. 7 is a schematic diagram of a mobile communication terminal provided by the present disclosure.

The present disclosure further provides a mobile communication terminal, and the mobile communication terminal is capable of operating within a downlink frequency range and at least two uplink frequency ranges. FIG. 7 is a schematic diagram of a mobile communication terminal provided by the present disclosure. As shown in FIG. 7, the mobile communication terminal 700 includes a receiver 701 and a processor 702.

The receiver 701 is configured to receive a physical random access channel parameter and frequency information of at least two uplink frequency ranges transmitted by the network device. The processor 702 is configured to initiate the random access by using a target physical random access channel parameter within a target uplink frequency range of the at least two uplink frequency ranges.

Optionally, the receiver 701 is configured to receive at least one of a selection parameter, a first priority-level parameter, a second priority-level parameter, and an access probability parameter transmitted by the network device; wherein the selection parameter is used by the mobile communication terminal to select an access uplink frequency range from the at least two uplink frequency ranges, or to select an access physical random access channel parameter from the received physical random access channel parameter; the first priority-level parameter is used to indicate priority levels corresponding to the at least two uplink frequency ranges; the second priority-level parameter is used to indicate a priority level corresponding to the physical random access channel parameter; and the access probability parameter is used to indicate access probability values corresponding to the at least two uplink frequency ranges.

Optionally, initiating, by the processor 702, the random access by using the target physical random access channel parameter within a target uplink frequency range of the at least two uplink frequency ranges, specifically includes: determining the access uplink frequency range from the at least two uplink frequency ranges according to the received selection parameter; determining the target uplink frequency range from the access uplink frequency range, and determining the target physical random access channel parameter; and initiating the random access by using the target random access channel parameter within the target uplink frequency range.

Optionally, determining, by the processor 702, the target uplink frequency range from the access uplink frequency range, specifically includes: randomly selecting an uplink frequency range from the access uplink frequency range as the target uplink frequency range.

Optionally, determining, by the processor 702, the target uplink frequency range from the access uplink frequency range, and determining the target physical random access channel parameter, specifically includes: determining the target uplink frequency range and/or the target physical random access channel parameter according to at least one of the received first priority-level parameter, the second priority-level parameter, and the access probability parameter.

Optionally, the selection parameter is a minimum downlink signal threshold; in the at least two uplink frequency ranges, except for a frequency range having largest coverage area, each frequency range has the respective minimum downlink signal threshold for allowing access, and a frequency range having a smaller coverage area corresponds to a higher minimum downlink signal threshold.

The minimum downlink signal threshold corresponding to the access uplink frequency range or a sum of the corresponding minimum downlink signal threshold and a compensation value is less than a downlink signal measurement value.

Optionally, the receiver 701 is configured to receive a frequency range designation parameter transmitted by the network device, wherein the frequency range designation parameter is used to designate at least one uplink frequency range of the at least two uplink frequency ranges; and the target uplink frequency range is one of the at least one uplink frequency range.

Optionally, the at least one frequency range is an uplink frequency range, having the largest coverage area, of the at least two uplink frequency ranges.

The mobile communication terminal of the present disclosure receives, by using the receiver, the physical random access channel parameter and frequency information of a downlink frequency range and at least two uplink frequency ranges transmitted by the network device; initiates, by using the processor, the random access by using the target physical random access channel parameter within the downlink frequency range and a target uplink frequency range of the at least two uplink frequency ranges. Since at least one uplink frequency range in a low frequency band is added based on an existing frequency band, the uplink frequency range in the low frequency band is paired with an uplink frequency range in a high frequency band, and an uplink coverage area at the high frequency band can be compensated by using an uplink coverage area at the low frequency band, thereby enhancing the uplink coverage area of the mobile communication terminal, reducing the difference between the coverage areas at the uplink and downlink frequency bands, and improving an overall performance of the system.

Figure 8:
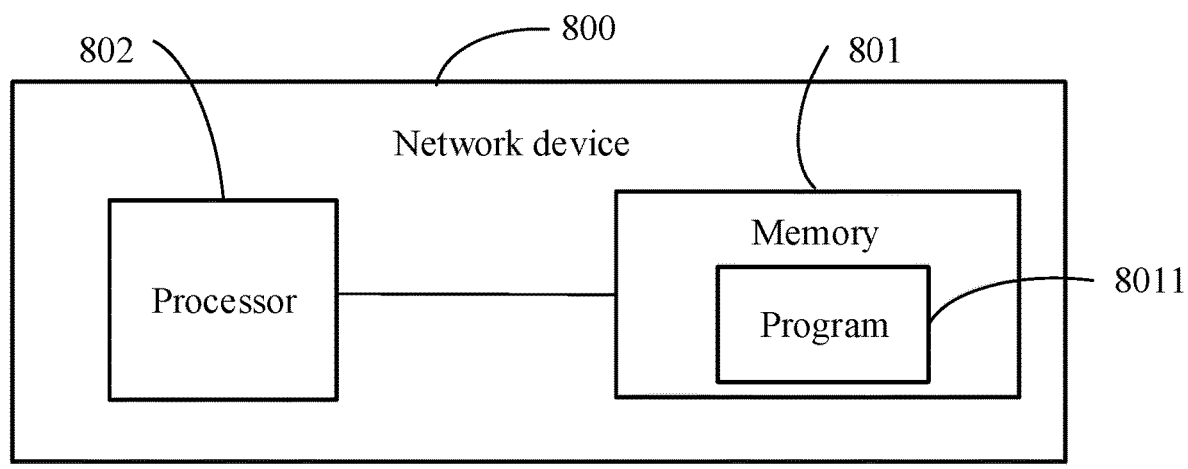
FIG. 8 is another schematic diagram of a network device provided by the present disclosure.

The present disclosure also provides a network device, and the network device is capable of operating within a downlink frequency range and at least two uplink frequency ranges. FIG. 8 is another schematic diagram of a network device provided by the present disclosure. As shown in FIG. 8, the network device 800 includes a memory 801 and a processor 802, wherein the memory 801 stores a computer program 8011 executable by the processor 802; when the computer program 8011 is executed by the processor 802, the processor 802 implements the following step: transmitting a physical random access channel parameter and frequency information of at least two uplink frequency ranges.

Optionally, in a case that the computer program 8011 is executed by the processor 802, the processor 802 also implements the following step: transmitting at least one of a selection parameter, a first priority-level parameter, a second priority-level parameter, and an access probability parameter; wherein the selection parameter is used by the mobile communication terminal to determine an access uplink frequency range from the at least two uplink frequency ranges; the first priority-level parameter is used to indicate priority levels corresponding to the at least two uplink frequency ranges; the second priority-level parameter is used to indicate a priority level corresponding to the physical random access channel parameter; and the access probability parameter is used to indicate access probability values corresponding to the at least two uplink frequency ranges.

Optionally, the selection parameter is a minimum downlink signal threshold.

Optionally, in the at least two uplink frequency ranges, except for a frequency range having largest coverage area, each frequency range has the respective minimum downlink signal threshold for allowing access, and a frequency range having a smaller coverage area corresponds to a higher minimum downlink signal threshold.

Optionally, in a case that the computer program 8011 is executed by the processor 802, the processor 802 also implements the following steps: transmitting a frequency range designation parameter; wherein the frequency range designation parameter is used to designate at least one uplink frequency range of the at least two uplink frequency ranges.

Optionally, the at least one frequency range is an uplink frequency range having the largest coverage area in the at least two uplink frequency ranges.

The network device of the present disclosure transmits a physical random access channel parameter and frequency information of a downlink frequency range and at least two uplink frequency ranges, so that the mobile communication terminal receives the frequency information of the downlink frequency range and the at least two uplink frequency ranges and the physical random access channel parameter, and initiates the random access by using the target physical random access channel parameter within a target uplink frequency range of the at least two uplink frequency ranges, wherein both the network device and the mobile communication terminal are capable of operating within a downlink frequency range and at least two uplink frequency ranges. Since at least one uplink frequency range in a low frequency band is added based on an existing frequency band, the uplink frequency range in the low frequency band is paired with an uplink frequency range in a high frequency band, and an uplink coverage area at the high frequency band can be compensated by using an uplink coverage area at the low frequency band, thereby enhancing the uplink coverage area of the mobile communication terminal, reducing the difference between the coverage areas at the uplink and downlink frequency bands, and improving an overall performance of the system.

Figure 9:
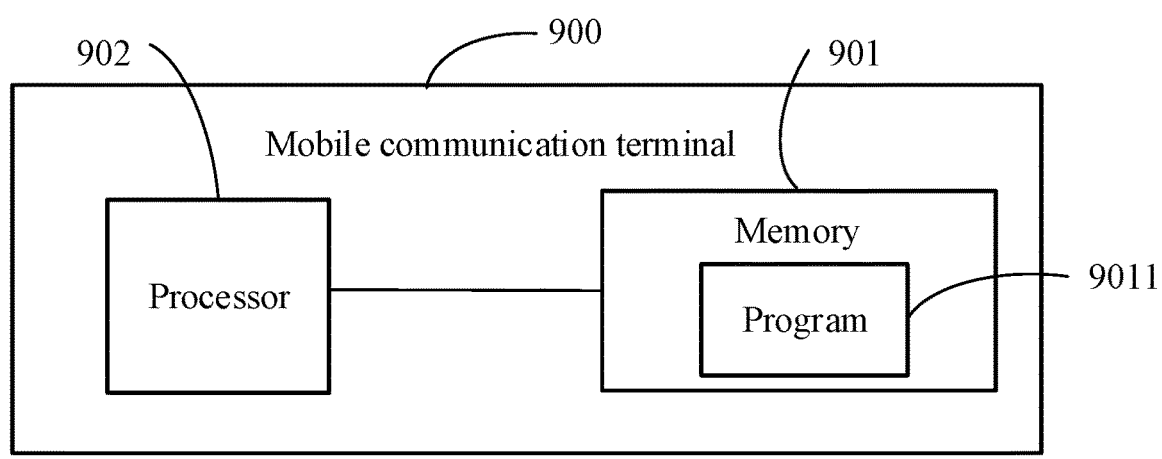
FIG. 9 is another schematic diagram of a mobile communication terminal provided by the present disclosure.

Referring to FIG. 9, the present disclosure further provides a mobile communication terminal. The mobile communication terminal 900 includes a memory 901 and a processor 902, wherein the memory 901 stores a computer program 9011 executable by the processor 902, when the computer program 9011 is executed by the processor 902, the processor 902 implements the following steps: receiving a physical random access channel parameter and frequency information of at least two uplink frequency ranges transmitted by a network device; and initiating the random access by using a target physical random access channel parameter within a target uplink frequency range of the at least two uplink frequency ranges.

Optionally, in a case that the computer program 9011 is executed by the processor 902, the processor 902 also implements the following steps: receiving at least one of a selection parameter, a first priority-level parameter, a second priority-level parameter, and an access probability parameter transmitted by the network device; wherein the selection parameter is used by the mobile communication terminal to select an access uplink frequency range from the at least two uplink frequency ranges, or to select an access physical random access channel parameter from the received physical random access channel parameter; the first priority-level parameter is used to indicate priority levels corresponding to the at least two uplink frequency ranges; the second priority-level parameter is used to indicate a priority level corresponding to the physical random access channel parameter; and the access probability parameter is used to indicate access probability values corresponding to the at least two uplink frequency ranges.

Optionally, in a case that the computer program 9011 is executed by the processor 902, the processor 902 further implements following steps: initiating the random access by using a target physical random access channel parameter within a target uplink frequency range of the at least two uplink frequency ranges, the processor 902 also implements the following step: determining the access uplink frequency range from the at least two uplink frequency ranges according to the received selection parameter; determining the target uplink frequency range from the access uplink frequency range, and determining the target physical random access channel parameter; and initiating the random access by using the target random access channel parameter within the target uplink frequency range.

Optionally, in a case that the computer program 9011 is executed by the processor 902 to determine the target uplink frequency range from the access uplink frequency range, the processor 902 also implements the following step: randomly selecting an uplink frequency range from the access uplink frequency range as the target uplink frequency range.

Optionally, in a case that the computer program 9011 is executed by the processor 902 to determine the target uplink frequency range from the access uplink frequency range, and determine the target physical random access channel parameter, the processor 902 also implements the following step: determining the target uplink frequency range and/or the target physical random access channel parameter according to at least one of the received first priority-level parameter, the second priority-level parameter, and the access probability parameter.

Optionally, the selection parameter is a minimum downlink signal threshold; in the at least two uplink frequency ranges, except for a frequency range having the largest coverage area, each frequency range has the respective minimum downlink signal threshold for allowing access, and a frequency range having a smaller coverage area corresponds to a higher minimum downlink signal threshold. The minimum downlink signal threshold corresponding to the access uplink frequency range or a sum of the corresponding minimum downlink signal threshold and a compensation value is less than a downlink signal measurement value.

Optionally, in a case that the computer program 9011 is executed by the processor 902, the processor 902 also implements the following steps: receiving a frequency range designation parameter transmitted by the network device, wherein the frequency range designation parameter is used to designate at least one uplink frequency range of the at least two uplink frequency ranges; and the target uplink frequency range is one of the at least one uplink frequency range.

Optionally, the at least one frequency range is an uplink frequency range having the largest coverage area in the at least two uplink frequency ranges.

The mobile communication terminal of the present disclosure receives the physical random access channel parameter and frequency information of a downlink frequency range and at least two uplink frequency ranges transmitted by the network device; initiates the random access by using the target physical random access channel parameter within a target uplink frequency range of the at least two uplink frequency ranges. Since at least one uplink frequency range in a low frequency band is added based on an existing frequency band, the uplink frequency range in the low frequency band is paired with an uplink frequency range in a high frequency band, and an uplink coverage area at the high frequency band can be compensated by using an uplink coverage area at the low frequency band, thereby enhancing the uplink coverage area of the mobile communication terminal, reducing the difference between the coverage areas at the uplink and downlink frequency bands, and improving an overall performance of the system.

The present disclosure also provides a computer readable storage medium including a computer program stored thereon, and in a case that the program is executed by a processor, the processor implements the access method of any one of the method embodiments.

Those skilled in the art may understand that all or some of the steps of implementing the method of the foregoing embodiment may be performed by a related hardware instructed by a program. The program may be stored in a computer-readable medium; when the program is executed by a processor, the processor implements the access method of any of the above method embodiments, and the same technical effect can be achieved, and will not be described herein to avoid repetition.

The computer-readable storage medium may be a volatile computer-readable storage medium or a non-volatile computer-readable storage medium, such as a Read-Only Memory (ROM), a Random Access Memory (RAM), a magnetic disk, an optical disk or the like.

The description above is optional embodiments of the present disclosure. It should be noted that improvements and embellishments may be made by one of ordinary skills in the art without departing the principle of the present disclosure. Such improvements and embellishments are also within the scope of the present disclosure.

What is claimed is:

1. An access method, applied to a network device and comprising:
   transmitting a physical random access channel parameter and frequency information of a downlink frequency range and at least two uplink frequency ranges, wherein the physical random access channel parameter and the frequency information are for one and the same cell;
   transmitting at least one of a selection parameter, a second priority-level parameter, and an access probability parameter;
   wherein, the selection parameter is used by a mobile communication terminal to determine an access uplink frequency range from the at least two uplink frequency ranges, or select an access physical random access channel parameter from the received physical random access channel parameter;
   the second priority-level parameter is configured to indicate a priority level corresponding to the physical random access channel parameter; and
   the access probability parameter is configured to indicate access probability values corresponding to the at least two uplink frequency ranges.

2. The access method according to claim 1, wherein the selection parameter is a minimum downlink signal threshold.

3. The access method according to claim 2, wherein, each frequency range, except for a frequency range having a largest coverage area, of the at least two uplink frequency ranges has a respective minimum downlink signal threshold for allowing access, and a frequency range having a smaller coverage area corresponds to a higher minimum downlink signal threshold.

4. The access method according to claim 1, further comprising:
   transmitting a frequency range designation parameter; and
   the frequency range designation parameter being configured to designate at least one frequency range of the at least two uplink frequency ranges.

5. The access method according to claim 4, wherein the at least one frequency range is an uplink frequency range, having a largest coverage area, of the at least two uplink frequency ranges.

6. An access method, applied to a mobile communication terminal and comprising:
   receiving a physical random access channel parameter and frequency information of a downlink frequency range and at least two uplink frequency ranges transmitted by a network device, wherein the physical random access channel parameter and the frequency information are for one and the same cell; and
   initiating a random access by using a target physical random access channel parameter within a target uplink frequency range of the at least two uplink frequency ranges;
   receiving at least one of a selection parameter, a second priority-level parameter, and an access probability parameter transmitted by the network device;
   wherein the selection parameter is used by the mobile communication terminal to select an access uplink frequency range from the at least two uplink frequency ranges, or to select an access physical random access channel parameter from the received physical random access channel parameter;
   the second priority-level parameter is configured to indicate a priority level corresponding to the physical random access channel parameter; and
   the access probability parameter is configured to indicate access probability values corresponding to the at least two uplink frequency ranges.

7. The access method according to claim 6, wherein initiating the random access by using the target physical random access channel parameter within the target uplink frequency range of the at least two uplink frequency ranges, specifically comprises:
   selecting an access uplink frequency range from the at least two uplink frequency ranges according to the received selection parameter;
   determining the target uplink frequency range from the access uplink frequency range, and determining the target physical random access channel parameter; and
   initiating the random access by using the target random access channel parameter within the target uplink frequency range.

8. The access method according to claim 7, wherein determining the target uplink frequency range from the access uplink frequency range, specifically comprises:
   randomly selecting an uplink frequency range from the access uplink frequency range as the target uplink frequency range.

9. The access method according to claim 7, wherein determining the target uplink frequency range from the access uplink frequency range, and determining the target physical random access channel parameter, specifically comprises:
   determining the target uplink frequency range and/or the target physical random access channel parameter according to at least one of the received first priority-level parameter, the received second priority-level parameter, and the received access probability parameter.

10. The access method according to claim 7, wherein the selection parameter is a minimum downlink signal threshold.

11. The access method according to claim 10, wherein each frequency range, except for a frequency range having a largest coverage area, of the at least two uplink frequency ranges has a respective minimum downlink signal threshold for allowing access, and a frequency range having a smaller coverage area corresponds to a higher minimum downlink signal threshold;
a minimum downlink signal threshold corresponding to the access uplink frequency range or a sum of the minimum downlink signal threshold and a compensation value is less than a downlink signal measurement value.

12. The access method according to claim 6, further comprising:
receiving a frequency range designation parameter transmitted by the network device, wherein the frequency range designation parameter is configured to designate at least one uplink frequency range of the at least two uplink frequency ranges; and
the target uplink frequency range is one of the at least one uplink frequency range.

13. The access method according to claim 12, wherein the at least one frequency range is an uplink frequency range, having a largest coverage area, of the at least two uplink frequency ranges.

14. A network device, comprising:
a transmitter, configured to transmit a physical random access channel parameter and frequency information of a downlink frequency range and at least two uplink frequency ranges, wherein the physical random access channel parameter and the frequency information are for one and the same cell;
wherein the transmitter is further configured to transmit at least one of a selection parameter, a second priority-level parameter, and an access probability parameter;
wherein the selection parameter is used by a mobile communication terminal to determine an access uplink frequency range from the at least two uplink frequency ranges, or select an access physical random access channel parameter from the received physical random access channel parameter;
the second priority-level parameter is configured to indicate a priority level corresponding to the physical random access channel parameter; and
the access probability parameter is configured to indicate access probability values corresponding to the at least two uplink frequency ranges.

15. A network device, comprising:
a memory and a processor, wherein the memory stores a computer program executable by the processor, and in a case that the computer program is executed by the processor, the processor implements the access method according to claim 1.

16. A mobile communication terminal, comprising:
a memory and a processor, wherein the memory stores a computer program executable by the processor, and in a case that the computer program is executed by the processor, the processor implements the access method according to claim 6.

17. The access method according to claim 1, further comprising:
transmitting a first priority-level parameter;
wherein, the first priority-level parameter is configured to indicate priority levels corresponding to the at least two uplink frequency ranges.

18. The access method according to claim 6, further comprising:
receiving a first priority-level parameter;
wherein, the first priority-level parameter is configured to indicate priority levels corresponding to the at least two uplink frequency ranges.

19. The network device according to claim 14, wherein the transmitter is further configured to transmit a first priority-level parameter;
the first priority-level parameter is configured to indicate priority levels corresponding to the at least two uplink frequency ranges.

* * * * *